June 1, 1965 H. DANIELI ETAL 3,186,915
EXCHANGING MACHINE FOR CONTROL ROD ASSEMBLY IN A NUCLEAR REACTOR
Filed June 25, 1962
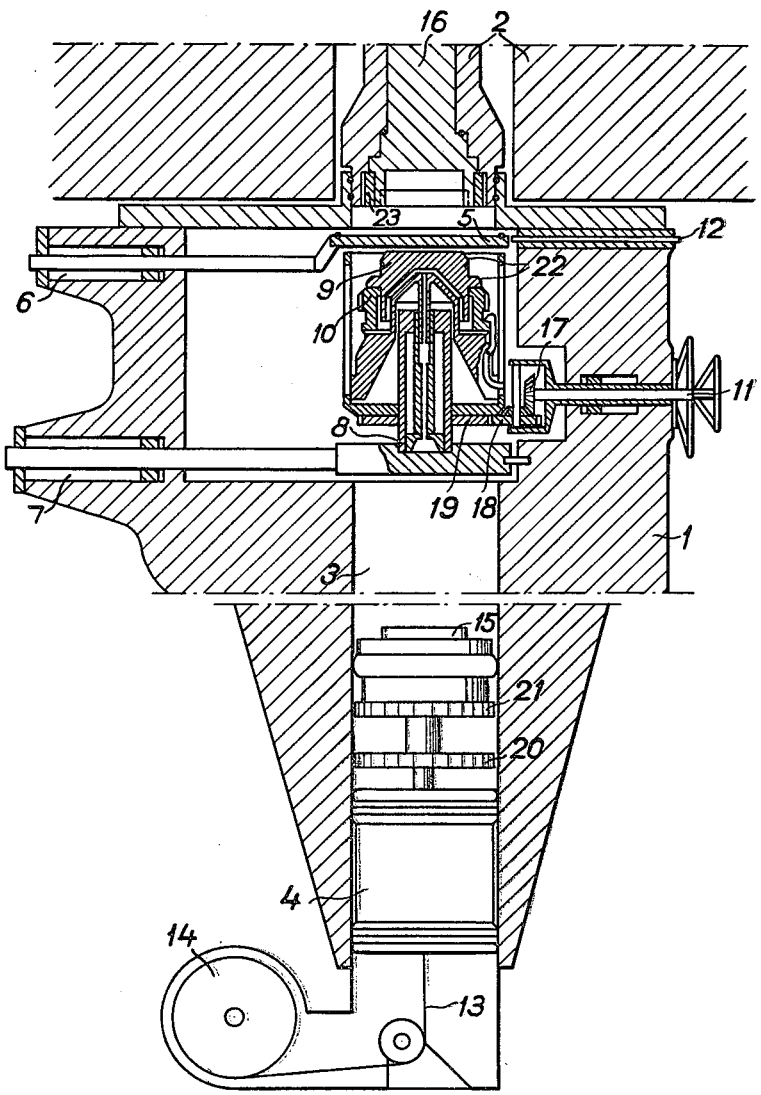
INVENTORS
Henrik Danieli
Eskil Monestam
BY
Bailey, Stephens & Huettig
ATTORNEYS

3,186,915
EXCHANGING MACHINE FOR CONTROL ROD ASSEMBLY IN A NUCLEAR REACTOR
Henrik Danieli, Foreningsgatan 18A, Vasteras, Sweden, and Eskil Mönestam, Stenhammargatan 15, Sundsvall, Sweden
Filed June 25, 1962, Ser. No. 205,053
Claims priority, application Sweden, June 30, 1961, 6,820/61
6 Claims. (Cl. 176—36)

The present invention relates to an exchanging machine for the control rod assemblies of a nuclear reactor, preferably intended for heavy water reactors.

When exchanging the control rod assemblies in a nuclear reactor extensive safety measures must be taken to prevent leakage from the reactor and to shield the radiation from the active control rod assemblies. The object of the invention is to solve the problems which arise in connection with this and an exchanging machine according to the invention comprises members for inserting and withdrawing control rod assemblies through openings into the reactor and is characterised in that these members are situated within a radiation protecting casing tightly connectable under the reactor, said casing forming an operating cylinder and being provided with means for applying all necessary sealing members and for disengaging the control rod assembly from the reactor and for connecting it to said withdrawing and inserting members and means for tightening and loosening a locking member for a sealing plug for said opening into the reactor, one and the same operating member being arranged to operate said means for disengaging and connecting the control rod assembly as well as said means actuating said plug locking member.

By applying the exchanging machine underneath the reactor the advantage is gained that the control rod assemblies are directly accessible at their attachment to the reactor since the control rod assemblies are normally attached from below. Further, it is easily possible to obtain the necessary space under the reactor for the arrangements required for supporting and controlling such an exchanging machine.

The sealing plug is moved from a storing position to a sealing position at the opening into the reactor and vice versa by two operating cylinders for horizontal and vertical movement respectively. The other operating members are operated from a hand wheel or a motor driven device outside the exchanging machine.

To prevent radioactive steam flowing out from the exchanging machine when this is not connected to the reactor, there is a valve in the opening of the exchanging machine which is closed before the exchanging machine is disengaged from the reactor. When being connected to the reactor, the whole exchanging machine is lifted somewhat so that its radiation shield is connected to the radiation shield of the reactor, and the control rod assemblies, during removal from the reactor to the exchanging machine, are thus the whole time completely surrounded by a radiation protection casing.

The invention will now be described in more detail with reference to the accompanying figure which shows schematically an exchanging machine according to the invention in cross section.

In the figure 1 designates the actual exchanging machine which is applied below the reactor 2. In the middle of the exchanging machine a main operating cylinder 3 and its piston 4 are seen. At the opening nearest the reactor is a sliding valve 5 which is operated from an operating cylinder 6. Below this operating cylinder is a second similar cylinder 7 which effects horizontal movement for a lifting member 8 for a sealing plug 9 and its locking ring 10 by which the opening into the reactor can be closed when the control rod assembly 16 has been taken out. The threaded locking ring 10 is turned manually or possibly by a motor driven operating means 11 which in its manual embodiment is directly actuated by the personnel outside the exchanging machine. This operating means actuates said locking ring by a bevel gearing 17 and a gear wheel 18 which engages in a corresponding gear wheel 19 on the lifting means for the sealing plug. The operating member 11, when the main operating piston is in its upper position, may also be brought into engagement with members situated near the piston for tightening and loosening the connecting screw of the piston for connection to the control rod assembly and of the locking ring for the control rod assembly itself. So that the member 11 may fulfill both these functions, the bevel gearing is arranged so that it may be turned 180° and thus the gear wheel 18 takes up two different levels. When the operating piston is in its uppermost position this gear wheel engages at one level with the corresponding gear wheel 20 of the connecting screw and at the second level in a corresponding gear wheel 21 for turning the locking ring 23 of the control rod assembly, said locking ring being shown in the figure holding the control rod assembly in its ordinary position.

The sealing plug 9 is provided at its upper end with small conical guiding surfaces 22 which guide the sealing plug into the opening even if minor adjusting errors arise so that the centre of the exchanging machine does not completely coincide with the centre of the reactor opening. When the lifting means 8 of the sealing plug has lifted the plug up to the opening in the reactor and its locking ring 10, with the help of the operating member 11, is almost completely tightened, a slanting guiding surface which is in communication with the locking ring will push out an indicator rod 12 which thus indicates to the personnel that the locking ring has substantially reached the bottom of the thread and is in such a position that satisfactory sealing is obtained. That the locking ring is completely tightened against the stop is indicated only by the resistance in the operating member 11 by which the ring is turned.

The main cylinder 3 of the exchanging machine acts at the same time as transport container for the control rod assembly. The piston 4 of the cylinder may be driven in a number of different ways, for example so that during upward movement the piston is actuated by a pressure medium flowing into the cylinder from below and during downward movement is actuated by the weight of the control rod assembly and/or suction in the space below the piston. As a pressure medium, the moderator water of the reactor may advantageously be utilized since leakage past the piston will then cause no damage to the reactor. The reactor and the space above the piston may be subjected to pressure with, for example nitrogen, in order to increase the pressure difference on the upper and lower sides of the piston. In the figure a preferred embodiment of the means for operating the piston is shown, which differs somewhat from that just described. In this embodiment nitrogen is used as a pressure medium below the piston in the exchanging machine, or some other inert gas which does not damage the reactor if there is a leakage past the piston.

The gas is allowed in under the piston through a reducing valve which gives the required pressure for lifting. The speed of the piston is regulated by a cable member 13 attached to the underside of the piston. The cable runs to a cable drum 14 which is enclosed in conjunction with the cylinder and driven by a motor outside a gastight part of the enclosing capsule. During upward movement the piston is braked by the motor which is connected and will then run with an over-synchronous revolution rate. If for some reason the piston stops, the motor is stopped by a slack wire indicator. During downward movement the piston is pulled by the cable, whereby the gas pressure is reduced to a value which is sufficient to prevent the piston from falling down. A complete operation for withdrawing a control rod assembly takes place as follows:

The reactor is closed and the pressure lowered to approximately atmospheric pressure. The control rod assemblies upon attachment to the reactor are provided with double sealings and the space between these should first be drained before the primary sealing, a welding sealing, is opened. When this has been done the exchanging machine can be connected and this is then moved forward under the respective control rod assembly and lifted up towards the reactor so that the radiation shield of the exchanging machine connects with the radiation shield of the reactor. The sliding valve 5 in the upper part of the exchanging machine is now pulled to the side and the main operating piston 4 moved up towards the control rod assembly. With the aid of the operating member 11, which in the manner described earlier actuates members on the piston 4, the extension piece 15 of the piston is connected by a connection screw or the like to the control rod assembly. By swinging the conical bevel gearing on the operating member 11, a member is now actuated which loosens the locking ring of the control rod assembly. The locking ring and connecting screw are threaded in opposite directions so that the turning direction for loosening one device is the same as that for tightening the other and vice versa. In this way there is no tendency for undesired loosening to occur in one of the devices when the other is loosened by the operating member. The extension piece 15 of the piston, onto which the control rod assembly is attached is attached at both ends in rubber bodies, the elasticity of which allows the displacements which arise due to incomplete centering between the exchanging machine and the opening of the reactor. When the control rod assembly has been lowered into the central cylinder 3, the operating member 8 is moved forward by the operating cylinder 7 and the sealing plug 9 and its locking ring 10 are lifted by this operating member towards the opening in the reactor. The locking ring 10 of the sealing plug is screwed in by the operating member 11 and when the sealing plug is in place and the locking ring tightened, the sliding valve 5 closes the exchanging machine. The space between the valve disc and the screwed in sealing plug is drained and dried with hot nitrogen gas. After this the exchanging machine may be disengaged from the reactor and the control rod assembly transported away for further treatment.

The separate details in an exchanging machine according to the invention may be varied in a number of different ways. It is suitable to use nitrogen gas as pressure medium in the operating cylinders since this gas is not damaging to either reactor or the personnel if, through a possible leakage, it gets into the reactor or onto the outside of the exchanging machine. Other pressure media having the same properties may of course be used equally well and in general the placing and shaping of the separate parts may be varied in many ways within the scope of the following claims.

We claim:
1. Exchanging machine for the exchange of control rod assemblies located inside a nuclear reactor, which reactor has an opening in the bottom for withdrawal of a control rod assembly therethrough and a locking member normally holding the control rod assembly in the reactor above the opening, said machine comprising a radiation protecting casing having an opening positioned to face the opening in the reactor bottom and being positionable beneath the reactor in engagement therewith, said casing including first means forming an operating cylinder, a member for withdrawing and inserting a control rod assembly through said openings mounted for reciprocating movement in said cylinder, second means operatively engageable with said control rod assembly locking member, third means to operate said second means to release said locking member, fourth means securable to the control rod assembly, said second and fourth means being carried by said withdrawing and inserting member, a sealing plug within the machine adapted to fit the opening in the reactor left open by the removal of a control rod assembly, said sealing plug having fifth means for securing it to the reactor, sixth means mounting said sealing plug for movement between a storage position out of alignment with said casing opening and a position beneath said casing opening, said mounting means including seventh means to move said sealing plug to secure it in the reactor opening and operating means selectably engageable with said second, fourth and seventh means.

2. Exchanging machine according to claim 1, in which said operating means comprises a bevel gear assembly turnable about an axis.

3. Exchanging machine according to claim 1, in which the casing has an enlargement of said operating cylinder at one side of the passage for said control rod assembly during withdrawal and insertion for receiving the sealing plug in the storage position.

4. Exchanging machine according to claim 1, in which said member for withdrawing and inserting a control rod assembly comprises an elastically resilient member carrying said fourth means.

5. Exchanging machine according to claim 1, in which said member for withdrawing and inserting a control rod assembly comprises an operating piston enclosed by said operating cylinder, and means to feed an inert gas to the space in the cylinder on one side of said piston.

6. In an exchanging machine according to claim 5, a motor driven and motor braked cable member connected to said piston for downward and upward movements respectively.

References Cited by the Examiner
UNITED STATES PATENTS
3,051,642   8/62   Dent _____ 176—30
FOREIGN PATENTS
225,999   12/59   Australia.
844,765   8/60   Great Britain.

CARL D. QUARFORTH, *Primary Examiner.*
REUBEN EPSTEIN, *Examiner.*